United States Patent [19]

Irikura et al.

[11] Patent Number: 5,778,645
[45] Date of Patent: Jul. 14, 1998

[54] TRANSMISSION FOR SELF-PROPELLED WALKING MOWERS

[75] Inventors: Koji Irikura, Kobe; Hirohiko Kawada, Amagasaki, both of Japan

[73] Assignee: Kanzaki Kokyukoki Mfg. Co., Ltd., Amagasaki, Japan

[21] Appl. No.: 706,796

[22] Filed: Sep. 3, 1996

[30] Foreign Application Priority Data

Oct. 11, 1995 [JP] Japan ................................. 7-317598

[51] Int. Cl.⁶ .......................... A01D 34/68; A01D 34/82
[52] U.S. Cl. ...................... 56/11.8; 56/16.9; 56/DIG. 6
[58] Field of Search ........................ 56/11.4, 11.5, 56/11.8, 11.7, 14.7, 16.9, 17.5, 16.7, DIG. 22, DIG. 6; 74/369, 333, 365.68

[56] References Cited

U.S. PATENT DOCUMENTS

| | | | |
|---|---|---|---|
| 4,117,652 | 10/1978 | Jones et al. | 56/11.8 |
| 4,557,104 | 12/1985 | Toillie et al. | 56/13.6 |
| 4,689,939 | 9/1987 | Seyerle | 56/11.8 X |
| 4,841,794 | 6/1989 | Hikishima | 56/11.8 X |
| 4,896,487 | 1/1990 | Hikishima et al. | 56/11.8 |

FOREIGN PATENT DOCUMENTS 609 185 A1   8/1994   European Pat. Off.
6-47221   12/1994   Japan.

Primary Examiner—Terry Lee Melius

[57] ABSTRACT

In a transmission (10) comprising a casing (12), a vertical input shaft (13) having an upper end which extends upwardly of the casing and carries an input pulley (14), and a horizontal wheel axle (18) for driving a pair of mower-drive wheels (3), the input shaft intersects the wheel axle at a location in close proximity to the axle and is supported by top and bottom walls (12a, 12b) of the casing. The vertical shaft and horizontal axle are connected by a hypoid gearing (26) having a hypoid pinion (27) mounted on the shaft and a larger hypoid gear (29) mounted on the axle. The transmission has a compact configuration while the input shaft is supported in a stable manner and while the transmission efficiency between the shaft and axle is kept high. Preferably, the larger hypoid gear is rotatably mounted on the axle and a frictional clutch (32) is disposed between the gear and axle.

5 Claims, 7 Drawing Sheets

TRANSMISSION FOR SELF-PROPELLED WALKING MOWERS

FIELD OF THE INVENTION

This invention relates to a transmission for self-propelled walking mowers. More particularly, the present invention relates to a transmission which has a compact configuration adapted for use in a small-sized mower and which contributes to lowering the center of gravity of a mower for a stable run of the mower.

BACKGROUND OF THE INVENTION

A self-propelled walking mower conventionally comprises a machine frame which includes a blade compartment and a transmission compartment, an engine mounted on the machine frame and having a vertical output shaft which extends downwardly, a mowing blade disposed within the blade compartment and adapted to be driven by the engine, left and right drive wheels, and a transmission disposed within the transmission compartment and adapted to be powered by the engine for driving left and right drive wheels. A belt-pulley mechanism is generally employed for transmitting power from the engine output shaft to the transmission, and the transmission generally includes a vertical input shaft having an upper end which extends upwardly of a transmission casing and carries an input pulley mounted thereon. The transmission further includes a horizontal wheel axle which extends leftwardly and rightwardly from the transmission casing to drive the left and right drive wheels.

For a speed-reducing connection between the vertical input shaft and the laterally extending horizontal wheel axle, there is employed either a bevel gearing, as shown in JP, Y2 (Japanese Utility Model Publication) No. 6-47221, or a worm gearing as shown in U.S. Pat. No. 4,117,652 and in EP 0 609 185 A1.

In a bevel gearing in which a bevel pinion on the vertical input shaft and a larger bevel gear on the horizontal wheel axle are meshed with each other, the input shaft and wheel axle must be arranged such that axes of these shaft and axle cross with each other perpendicularly. Consequently, if the input shaft were extended toward the wheel axle, the shaft would interfere with the axle. It is thus seen that the input shaft cannot be extended downwardly beyond the wheel axle for its both ends-supported structure in which this shaft is supported by a transmission casing not only at a location above the axle but at another location below the axle. Thus, there is employed one end-supported structure in which the vertical input shaft is supported only by a top wall of the transmission casing. In this structure, the input shaft is supported at a relatively large span thereof so that it will be supported in a stable manner against the tension applied by belt. This means that the vertical width of the transmission is enlarged as a whole and, therefore, the input pulley on the upper end of the input shaft is located at a relatively high level. The level of an output pulley on the engine output shalt and, therefore, that of the engine are heightened correspondingly so that the center of gravity of the mower is located at a relatively high level. As a result, the running stability of mower may be lost.

In a worm gearing in which the vertical input shaft is spaced largely from the horizontal wheel axle in the longitudinal direction of the mower and a worm on the input shaft is meshed with a worm wheel on the wheel axle, the input shaft can be extended downwardly without any interference with the wheel axle. Thus, both ends-supported structure is employed and the input shaft is supported at its upper and lower end portions by a transmission casing. In this case, however, the width of the transmission casing in the longitudinal direction of the mower is adversely enlarged because of a large interval between the input shaft and the wheel axle. Further, as is well-known, a worm gearing is relatively low in the transmission efficiency and will generate a relatively large amount of heat due to slip or sliding contact between the worn and worm wheel.

Accordingly, a primary object of the present invention is to provide an improved transmission for self-propelled walking mowers which is compact both in the vertical direction and in the longitudinal direction of the mower while an input shaft is supported in a stable manner.

An attendant object is to provide a novel transmission in which a high transmission efficiency is maintained and the generation of heat is suppressed.

A futher attendant object of the invention is to provide a novel transmission in which a clutch for connecting and disconnecting between an input shaft and a wheel axle is incorporated without sacrificing the compactness of the transmission.

SUMMARY OF THE INVENTION

The present invention relates to a transmission for a self-propelled walking mower which comprises: a machine frame 1 which includes a blade compartment 6 and a transmission compartment 7; an engine 8 mounted on the machine frame 1 and having a vertical output shaft 9 which extends downwardly; a mowing blade 10 disposed within the blade compartment 6 and adapted to be driven by the engine 8; left and right drive wheels 3; and the above-referenced transmission 11 adapted to be powered by the engine 8 for driving the drive wheels 3.

The transmission according to the present invention comprises: a casing 12 disposed within the transmission compartment 7; a horizontal wheel axle 18 which is journalled in the casing 12 and extends leftwardly and rightwardly from the casing to drive the drive wheels 3; and a vertical input shaft 13 having an upper end which extends upwardly of the casing 12 and carries an input pulley 14 mounted thereon. In particular, the input shaft 13 is rotatably supported by a top wall 12a of the casing and by a bottom wall 12b of the casing and is disposed such that it intersects the wheel axle 18 at a location in close proximity to the wheel axle. For connecting between such input shaft and wheel axle, a hypoid gearing 26 is particularly employed and it includes a hypoid pinion 27, which is mounted on the input shaft 13, and a larger hypoid gear 29 which is mounted on the wheel axle 18 and is in meshment with the hypoid pinion 27.

As a gear mechanism for connecting between two rotatable shafts which extend perpendicularly to each other in an intersecting relationship with an interval therebetween, a hypoid gearing generally provides a small slip ratio and a high transmission efficiency as compared to a worm gearing. And, the slip ratio between meshing hypoid gears is decreased to provide a higher transmission efficiency as the interval or offset distance between the two shafts is decreased. When a hypoid gearing is employed for connecting a vertical input shaft and a horizontal wheel axle, the input shaft can be disposed such that it intersects the wheel axle without causing any interference with the axle. Taking notice of these points, the present invention has taken the arrangement that the vertical input shaft 13 is disposed so as to intersect the horizontal wheel axle 18 at a location in close proximity to the axle, that the input shaft 13 is Supported in a stable both ends-supported structure by top and bottom walls 12a acid 12b of the casing 12, and that the input shaft 13 and wheel axle 18 are connected through a hypoid gearing 26.

Owing to the both ends-supported structure of input shaft 13 by the casing 12, the input shaft is supported in a stable manner against the tension of belt applied through the input pulley 14 thereon so that there is no need of supporting the input shaft at a large span thereof as in the case of the one end-supported input shaft of a bevel gearing according to the prior art. Thus, the vertical width of the casing 12 or transmission 11 is reduced so that the level of the input pulley 14 and, therefore, that of the engine 8 are lowered. Consequently, the center of gravity of the mower is located at a low level so that the running stability of the mower is assured. Contrary to a transmission in which a worm gearing is employed according to the prior art, there is no need of arranging the input shaft 13 and wheel axle 18 with a large interval therebetween in the longitudinal direction of the mower. In fact, such an arrangement which will lower the transmission efficiency of a hypoid gearing is excluded according to the present invention such that the input shaft 13 intersects the wheel axle 18 at a location in close proximity to the axle. Consequently, the width of the casing 12 or transmission 1 1 in the longitudinal direction of the mower is largely reduced.

Thus, the transmission 11 according to the present invention can be made compact both in the vertical direction and in the longitudinal direction of the mower whereby a small-sized machine frame 1 having a small-sized transmission compartment 7 is satisfactorily employed. Nevertheless, a high running stability of the mower is assured. Owing to the hypoid gearing 26, a high transmission efficiency is assured between the input shaft 13 and wheel axle 18 to reduce the loss of energy and, because the generation of heat is suppressed, the transmission casing 12 of a plastic material call be employed for a cost-saving purpose.

Preferably, a clutch is provided for permitting free rotation of the drive wheels 3, when the mower is retreated by pulling or when the mower is turned with a large radius of turn, so as to reduce operating force. According to a preferred embodiment of the present invention, the above-referenced larger hypoid gear 29 is rotatably mounted on the wheel axle 18 and a clutch 32 is provided for selectively coupling this hypoid gear 29 to the axle. The clutch includes a movable clutch member 33 which is slidably but non-rotatably mounted on the wheel axle 18 at a side opposite to the input shaft 13 with the hypoid gear 32 therebetween. The movable clutch member 33 of this arrangement can have any desired configuration without being restricted by the input shaft 13 and by the hypoid gearing 26. The clutch 32 is provided in an arrangement to be kept away from the meshing portion of the gearing 26 so that the compactness of the transmission is riot sacrificed by the provision of the clutch.

Preferably, the clutch 32 is fashioned into a frictional clutch having a first frictional surface 29a, which is formed in the larger hypoid gear 29, and a second frictional surface 33a which is formed in the movable clutch member 33. This clutch 32 can be designed as a frictional clutch having a large friction area by making use of the side surface of hypoid gear 29 opposite to the toothed side thereof. Thus, the clutch can have a large capacity while it is kept compact in the axial direction of the wheel axle 18. Consequently, a high transmission efficiency through the clutch is assured. Because a frictional clutch can freely be brought into a halt-engaged or slipping condition, a smooth start of the mower can be attained in a half-engaged condition of the frictional clutch 32 or the travel speed of the mower call be reduced optionally by bringing the clutch into a half-engaged condition.

For reducing largely the offset distance between the input shaft 13 and the wheel axle 18 and thereby hightening further the transmission efficiency of the hypoid gearing 26, it is preferred that at least one of the input shaft 12 and the wheel axle 18 includes an outer diameter-reduced portion 13a, 18a at the intersection of these shaft and axle.

In another preferred embodiment of the present invention, the input shaft 13 is composed of a first shaft portion 13A, which has the hypoid pinion 27 formed integral therewith, and a second shaft portion 13B which is formed separately from the first shaft portion 13A and is fixedly attached to the first shaft portion. The hypoid pinion 27 which is formed integral with the first shaft portion 13A is supported by the input shaft 13 in a stable manner, so that it can be small in diameter as compared to a separately formed hypoid pinion which is keyed or otherwise attached to the input shaft. Such a hypoid pinion of a smaller diameter will make it possible to heighten the speed-reduction ratio of the hypoid gearing 26. Further, the stably supported hypoid pinion 27 permits the employment of an input shaft 13 of a smaller diameter so as to further reduce the offset distance between the shaft and axle and to thereby further highten the transmission efficiency of the hypoid gearing 26.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
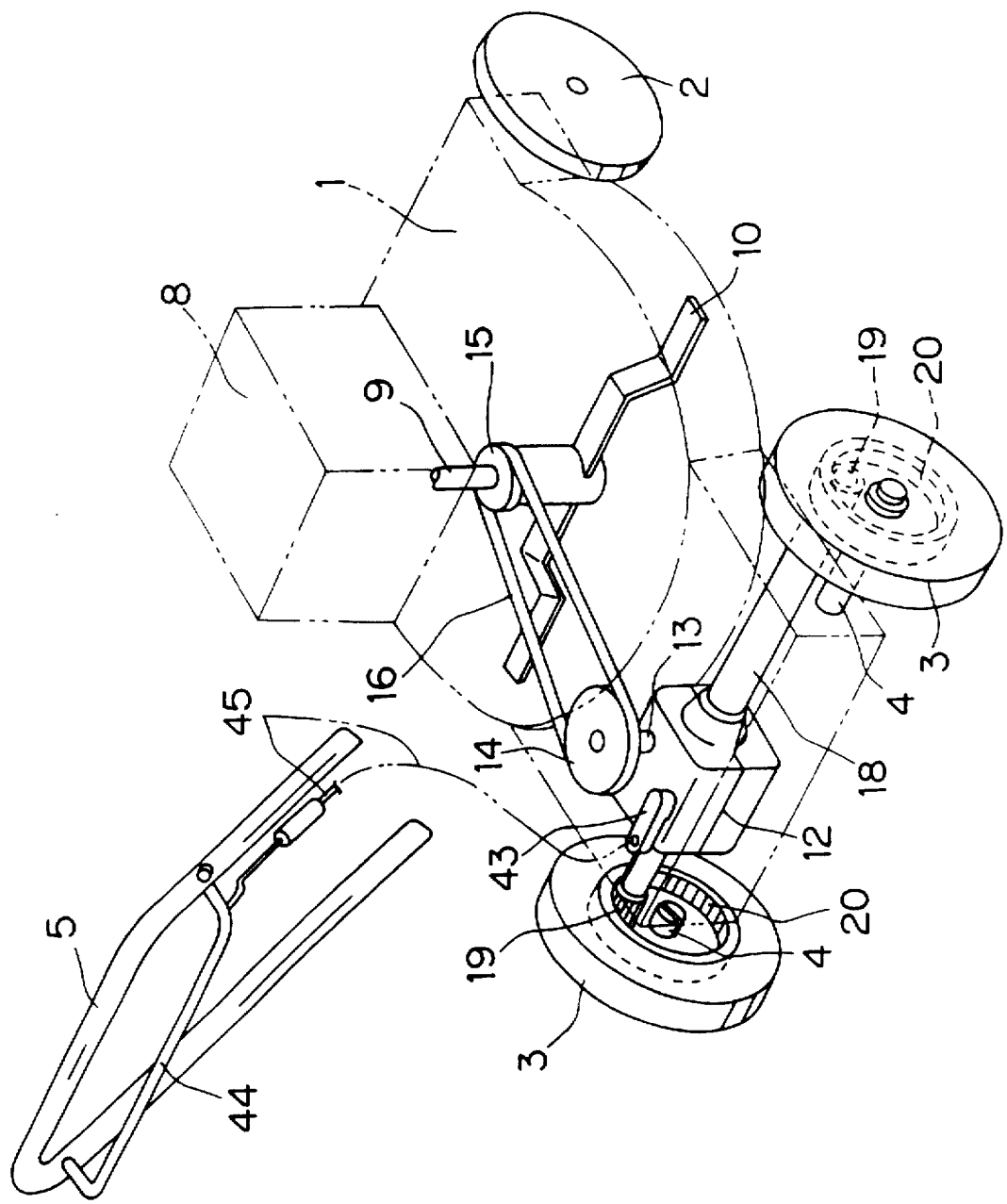
FIG. 1 is a schematic perspective view of a self-propelled walking mower in which a first embodiment of the transmission according to tie present invention is employed.
Figure 2:
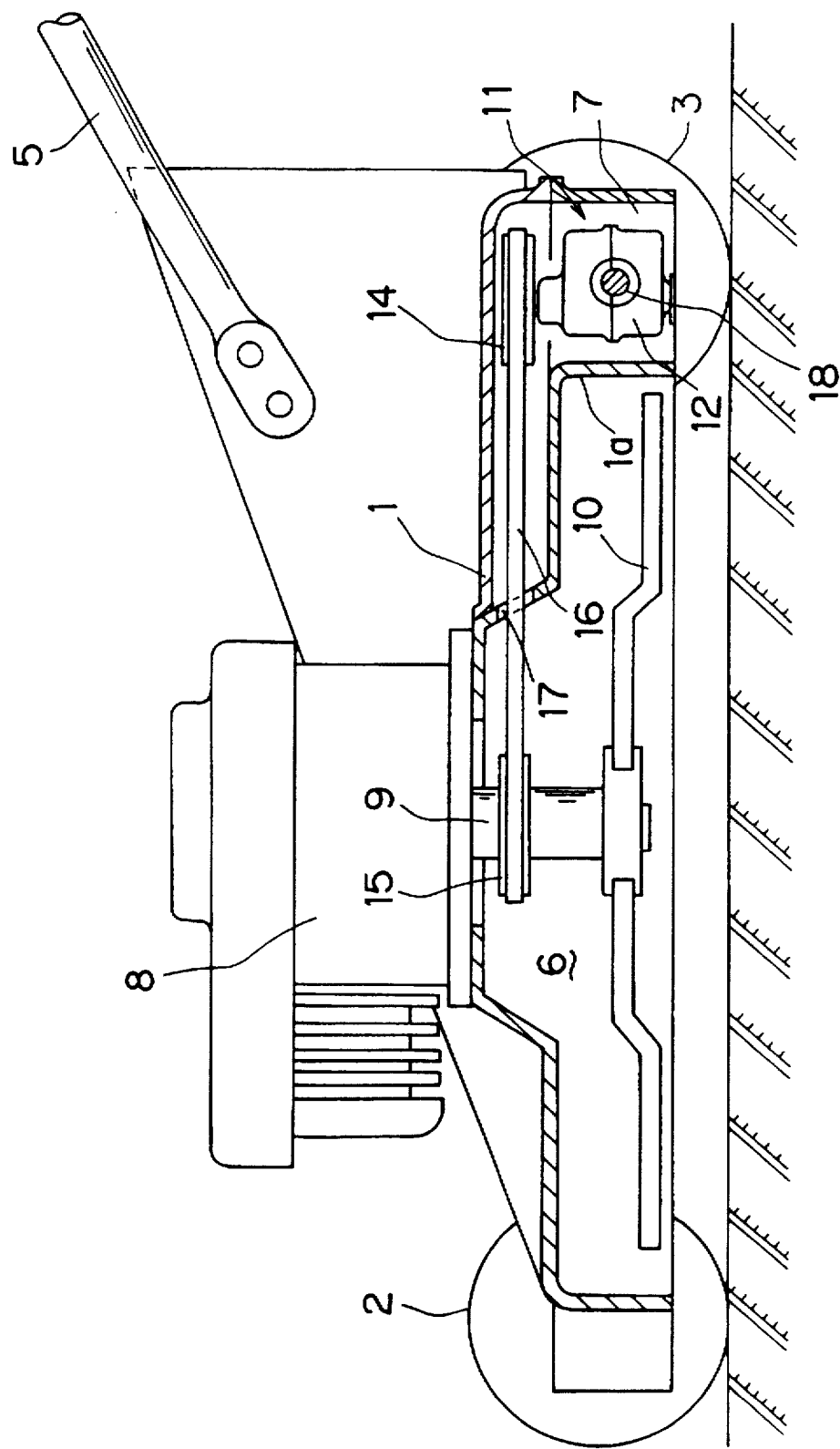
FIG. 2 is a sectional side view, partially omitted, of the mower shown in FIG. 1.

FIGS. 1 and 2 depict a self-propelled walking mower in which a transmission according to the present invention is employed. The mower has a deck-shaped machine frame 1 which is equipped, at a front end portion thereof, with a pair of freely rotatable left and right front wheels 2 and, at a rear end portion, with a pair of left and right rear wheels 3 as drive wheels. The left and right rear wheels 3 are rotatably mounted on left and right support shafts 4 which are fixedly attached to the machine frame 1. A steering handle 5 is attached to a rear end portion of the frame 1 and extends backwardly and upwardly from the frame.

Machine frame 1 has an open bottom end. The inside of this frame 1 is divided by an internal partition la into a blade compartment 6 of a front side having a large axial width, and a transmission compartment 7 of a rear side having a small axial width. Engine 8 as a drive source is mounted on the machine frame at a location above a central portion of the blade compartment 6, and it has a vertical output shaft 9 which extends downwardly. Mowing blade 10 is disposed within the blade compartment 6 and is attached to a lower end of the output shalt 9 so as to be driven directly by the engine output shalt.

Transmission 11 is disposed within the transmission compartment 7, and it has a casing 12 composed of upper and lower casing halves which are joined together as shown. A vertical Input shalt 13 extends upwardly from the inside of the casing 12 and carries, at its upper end, an input pulley 14 mounted thereon. An output pulley 15 is fixedly mounted on the engine output shalt 9 at a location above the mowing blade 10. A belt 16, which passes through an aperture 17 in the partition 1a, is entrained over pulleys 14 and 15 for transmitting drive power from the output shalt 9 to the input shaft 13. A horizontal wheel axle 18 extends leftwardly and rightwardly from the casing 12 and has, at its both ends, pinions 19. Each of the left and right rear wheels 3 includes, at the inner circumference of its wheel rim, all internal gear 20 which meshes with each pinion 19, so that left and right rear wheels 3 are driven to rotate by the wheel axle 18 at a reduced speed of rotation.

Figure 3:
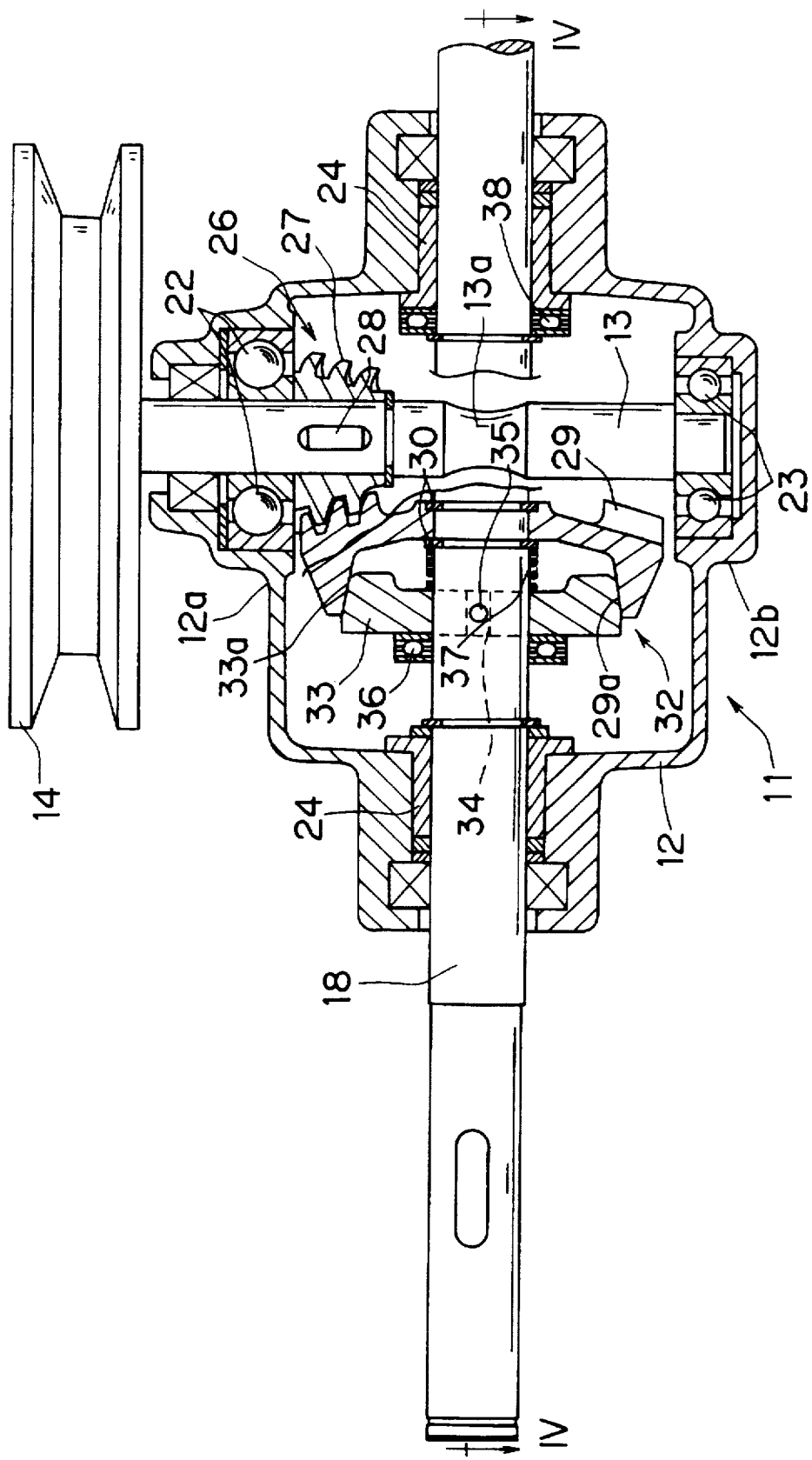
FIG. 3 is a sectional front view of a transmission shown in FIGS. 1 and 2.
Figure 4:
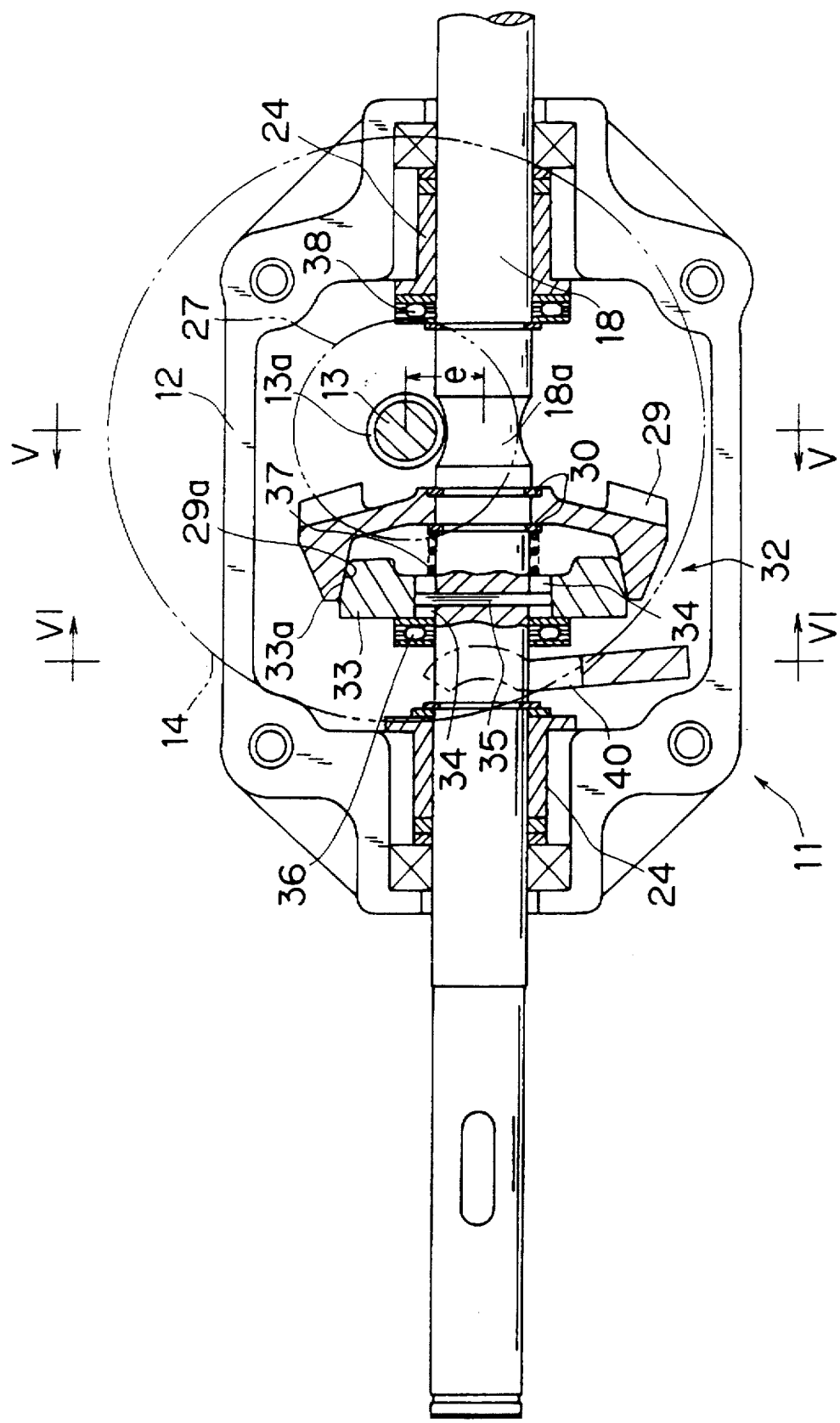
FIG. 4 is a cross-sectional view taken along line IV—IV of FIG. 3.
Figure 5:
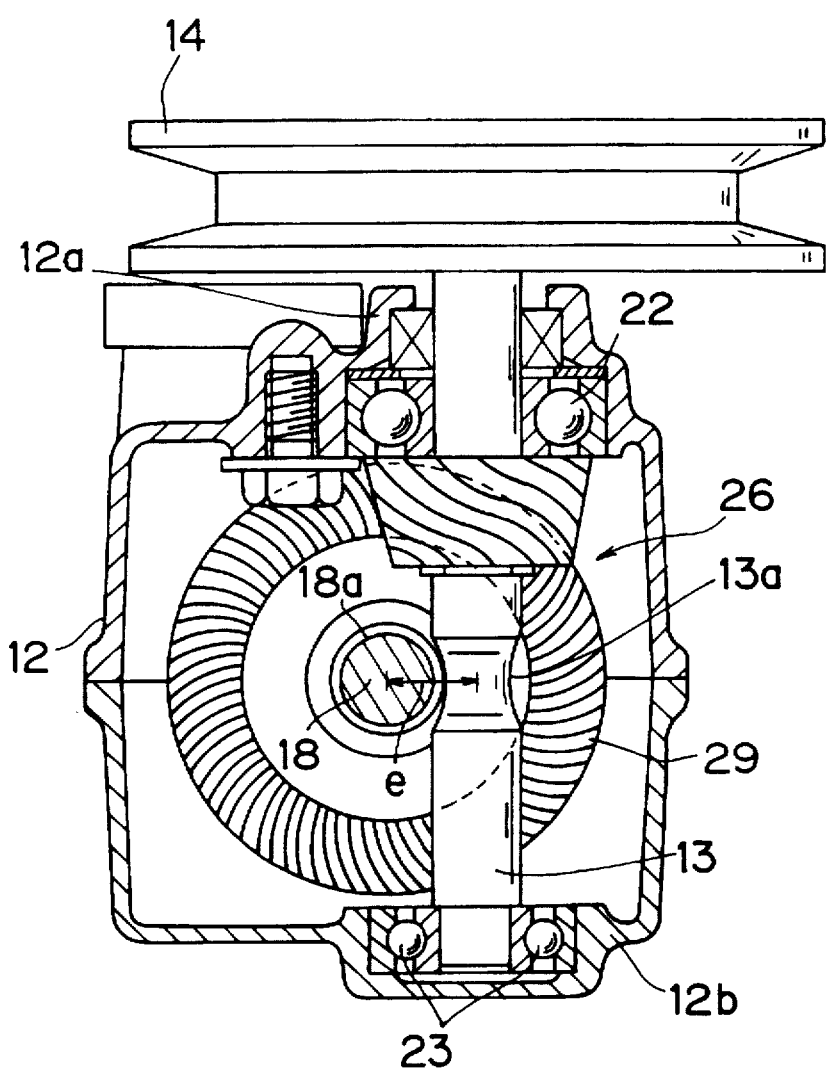
FIG. 5 is a sectional view taken generally along line V—V of FIG. 4.

FIGS. 3 through 6 depict the transmission 11 of a first embodiment. As shown in FIGS. 3 to 5, the input shaft 13 is disposed at a front side of the wheel axle 18 in close proximity to the axle. This input shaft 13 is of a length having its lower end adjacent to the inner bottom of casing 12 and is rotatably supported by a top wall 12a of the casing and by a bottom wall 12b of the casing respectively through ball bearings 22 and 23. These ball bearings may be replaced with other bearing means such as bushings or bearing surfaces integrally formed in the walls 12a and 12b. The wheel axle 18 is rotatably supported by embrasing portions formed in the joint surfaces of the upper and lower casing halves through left and right bushings 24 each of which includes an annular flange abutting against an inner wall of the casing 12. Bushings 24 may also be replaced with other suitable bearing means. The vertical input shalt 13 and the horizontal wheel axle 18 are arranged such that they are as close as possible to each other. In the embodiment shown, outer diameter-reduced portions 13a and 18a are formed in these shaft 13 and axle 18 at the intersection thereof so as to make the offset distance (e) (FIGS. 4 and 5) between the shaft 13 and axle 18 as small as possible.

A hypoid gearing 26 is employed for connecting between the vertical input shaft 13 and the horizontal wheel axle 18. This gearing 26 is composed of a hypoid pinion 27, which is fixedly mounted on the input shaft 13 using a key 28, and a larger hypoid gear 29 which is rotatably mounted on the wheel axle 18 and is prevented from axial displacement by a pair of retailing rings 30. The hypoid pinion 27 is mounted on the input shaft 13 at an uppermost location within the casing 12 and is in meshment with the larger hypoid gear 29 at such uppermost location.

Figure 6:
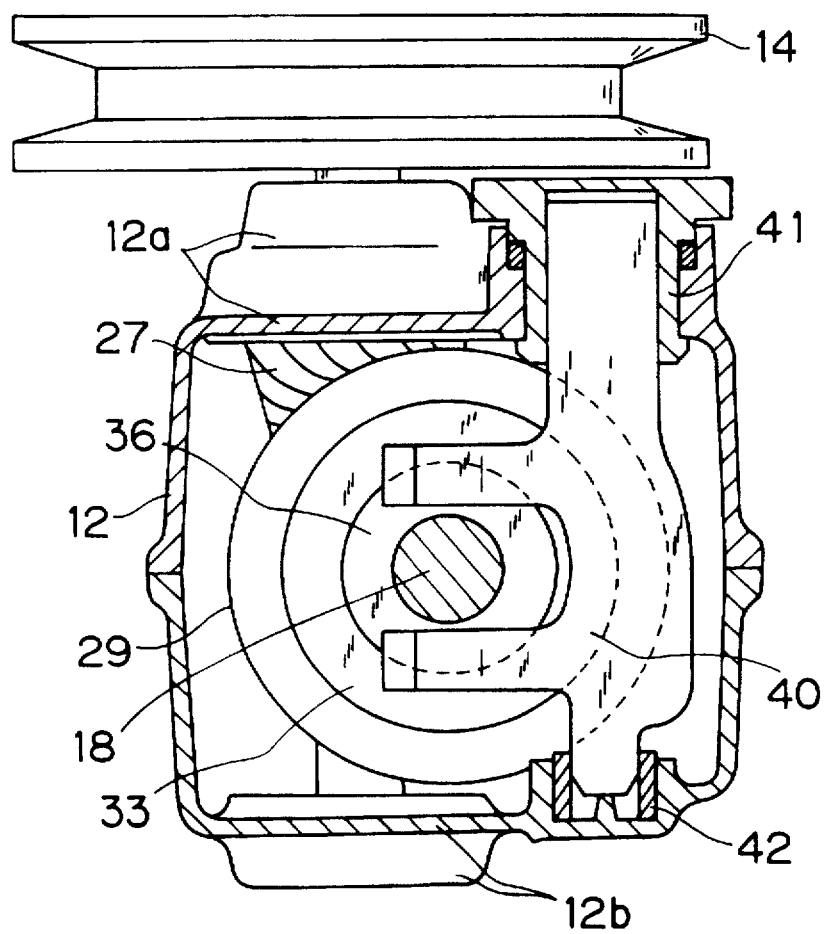
FIG. 6 is a sectional view taken generally along line VI—VI of FIG. 4.

For coupling the larger hypoid gear 29 selectively to the wheel axle 18, a clutch 32 is provided. As shown in FIGS. 3, 4 and 6, this clutch 29 includes a movable clutch member 33 which is mounted on the wheel axle 18 at a side opposite to the input shaft 13 with the hypoid gear 29 therebetween. The movable clutch member 33 includes, in its inner circumference, a pair of diametrically opposed axial grooves 34 into which a pin 35 carried by and extending radially through the wheel axle 18 projects at its both ends so that the cluch member 33 is slidable but non-rotatable with respect to axle 18. The larger hypoid gear 29 includes, in its side surface opposite to the toothed side, a cone-shaped frictional surface 29a. A second cone-shaped frictional surface 33a is formed in the movable clutch member 33 and is frictionally engageable with the former frictional surface 29a. A thrust bearing 36 is slidably mounted on the wheel axle 18. A coil spring 37 is disposed on the wheel axle 18 and is received, at its base end, by one of the pair of retaining rings 30. Spring 37 acts upon the movable clutch 33 and is operable to biase it to move such that the frictional engagement between the frictional surfaces 29a and 33a is released and such that the clutch member 33 keeps in contact with the thrust bearing 36. Another thrust bearing 38, abutting against the bushing 24 of one side, is also disposed on the wheel axle 18 and is prevented from moving away from the bushing by a retaining ring. Thus, axial thrust applied to the wheel axle 18 is received by the casing 12 through the thrust bearing 38 and through the bushing 24.

As shown in FIGS. 4 and 6, a fork member 40 is disposed within the casing 12 and engages the slidable thrust bearing 36 from the side opposite to the clutch member 33. This fork member 40 is made of a sheet metal and is supported, at its upper and lower ends, by the top and bottom walls 12a and 12b of casing 12 through upper and lower tubular members 41 and 42 such that the fork member is rotatable together with the tubular members about a vertical axis. The upper tubular member 41 extends upwardly of the casing 12 and has a clutch arm 43, shown in FIG. 1, attached thereto. As shown in FIG. 1, a rotatable clutch lever 44 is affixed to the steering handle 5 and is connected to the clutch arm 43 through a control cable 45 which is tensed when the clutch lever 44 is grasped together with the steering handle 5.

Consequently, the clutch 32 is designed as a so-called deadman-type clutch and is normally kept in its disengaged condition in which the frictional surface 33a of the movable clutch member 33a is disengaged from the frictional surface 29a of the hypoid gear 29 by the biasing action of coil spring 37 upon the movable clutch member 33. When the clutch lever 44 shown in FIG. 1 is grasped together with the steering handle 5 to give tension to the control cable 45 and to thereby rotate the clutch arm 43, the fork member 40 is rotated to cause a sliding movement of the thrust bearing 36 toward the movable clutch member 33 so that this clutch member is pushed against the biasing force of spring 37 to cause a frictional engagement of the frictional surface 33a with the frictional surface 29a. An optional half-engaged condition of clutch 32 can also be attained by controlling the grasping force applied to the clutch lever 44 so as to control the displacement of the movable clutch member 33 along the wheel axle 18 and to thereby control the thrusting force of the frictional surface 33a against the frictional surface 29a.

A smooth start of the mower shown in FIG. 1 can be attained by starting the engine 8 under a condition in which the clutch lever 44 is released, and then by grasping the clutch lever 44 gradually to engage the clutch 32 through half-engaged conditions. Because the input shaft 13 and wheel axle 18 are arranged in immediate or close proximity to each other so as to make the offset distance (e) (FIGS. 4 and 5) therebetween as small as possible, and because there is employed a hypoid gearing 26 which is originally much higher in the transmission efficiency than a worm gearing, a high transmission efficiency between the input shaft 13 and the wheel axle 18 is assured by the hypoid gearing 26. Energy loss and the generation of heat are largely suppressed. When the mower is to be turned with a large radius of turn by operating the steering handle 5 or to be retreated by pulling the handle 5, force required for such operation is largely reduced by once disengaging the clutch 32.

Figure 7:
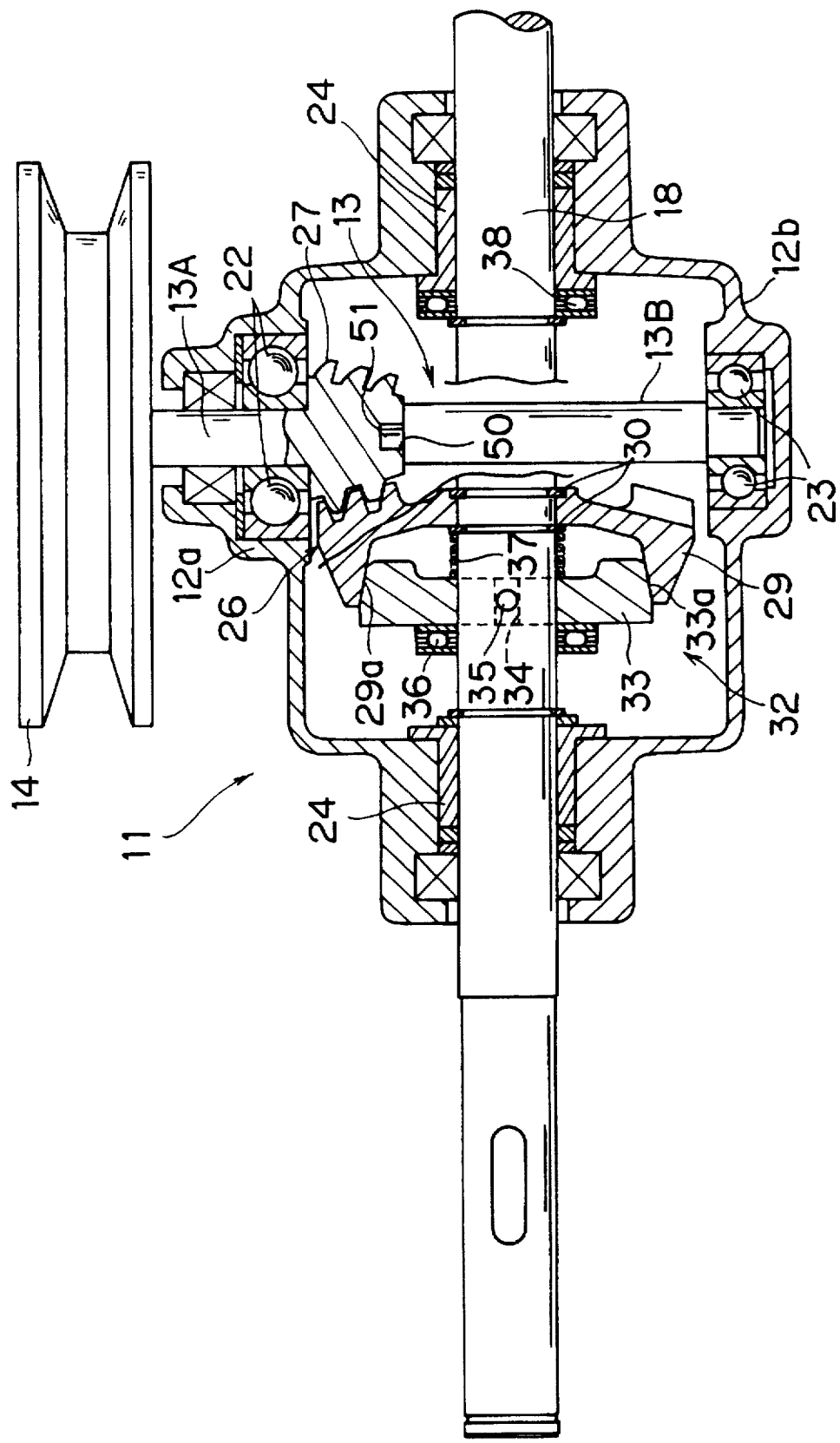
FIG. 7 is a sectional front view similar to FIG. 3, but showing a second embodiment of the transmission according to the present invention.

FIG. 7 depicts a second embodiment in which input shaft 13 is divided into an upper first shaft portion 13A and a lower second shaft portion 13B. The first shaft portion 13A has, at its upper end extending upwardly of the casing 12, an input pulley 14 mounted thereon and, at a lower end, a hypoid pinion 27 which is formed integral with the first shaft portion. The first shaft portion 13A further includes, in its lower end face, a bore 50 into which a pin-shaped integral projection 51 on the upper end face of the second shaft portion 13B is fitted. The first and second shaft portions 13A and 13B are joined together by a press-fitting of projection 51 into the bore 50, by welding in addition to the press-fitting, by an independent welding, or by another suitable means. The input shaft 13 thus formed is rotatably supported, as in the first embodiment, by the top and bottom walls 12a and 12b of casing 12. The other parts of the second embodiment are substantially the same as the corresponding parts of the first embodiment.

According to the second embodiment shown in FIG. 7, the hypoid pinion 27 integral with the first shaft portion can have a diameter smaller than that of the separately formed hypoid pinion employed in the first embodiment. Such a hypoid pinion of a smaller diameter will contribute to heightening the speed-reduction ratio of the hypoid gearing 26. The integrally formed hypoid pinion 27 is supported in a stable manner on the input shaft 13, so that the input shaft can be smaller in diameter than the input shaft employed in the first embodiment. Such small-sized input shaft 13 and hypoid pinion 27 will contribute to reducing the offset distance between the input shaft 13 and the wheel axle 18 and, therefore, to heightening the transmission efficiency of the hypoid gearing 26.

While preferred embodiments of the invention have been described, it will be appreciated that various modifications and changes may be made without departing from the spirit and scope of the appended claims.

We claim:

1. In a self-propelled walking mower which comprises: a machine frame (1) which includes a blade compartment (6) and a transmission compartment (7), said blade compartment and said transmission compartment being disposed respectively at a front side and at a rear side as viewed in a longitudinal direction of the mower; an engine (8) mounted on said machine frame at a location above said blade compartment and having a vertical output shaft (9) which extends downwardly; a mowing blade (10) disposed within said blade compartment and adapted to be driven by said engine; left and right drive wheels (3) for driving the mower; and a transmission (11) for transmitting mower-driving power from said engine to said drive wheels, said transmission comprising:

a casing (12) disposed within said transmission compartment (7);

a horizontal wheel axle (18) journalled in said casing, said wheel axle extending leftwardly and rightwardly from said casing to drive said left and right drive wheels (3);

a vertical input shaft (13) rotatably supported by a top wall (12a) of said casing and by a bottom wall (12b) of said casing and having an upper end which extends upwardly of said casing and carries an input pulley (14) co-rotatably mounted thereon, said input shaft intersecting said wheel axle at a location in front of and in close proximity to said wheel axles said input shaft being adapted to be driven to rotate by said output shaft (9) through an output pulley (15) co-rotatably mounted on said output shaft and through a belt (16) entrained over said output pulley and said input pulley;

a hypoid gearing (26) including a hypoid pinion (27) fixedly mounted on said input shaft, and a larger hypoid gear (29) rotatable mounted on said wheel axle and meshing with said hypoid pinion; and a clutch (32) for selectively coupling said larger hypoid gear (29) to said wheel axle (18), said clutch including a movable clutch member (33) which is slidably but non-rotatably mounted on said wheel axle at a side opposite to said input shaft (13) with said larger hypoid gear therebetween.

2. The transmission as set forth in claim 1, further comprising a clutch arm (43) for operating said movable clutch member (33) to thereby couple said larger hypoid gear (29) to said wheel axle (18), said clutch arm being disposed at a location above said casing (12) and behind said input pulley (14) and supported by said casing rotatable about a vertical axis.

3. The transmission a set forth in claim 2, wherein said clutch (32) is fashioned into a frictional clutch having a first friction surface (29a) formed in said larger hypoid gear (29), and a second frictional surface (33a) formed in a said movable clutch member (33).

4. The transmission as set forth in claim 1, wherein said input shaft (13) is composed of a first shaft portion (13A) having said hypoid pinion (27) formed integral therewith, and a second shaft portion (13B) formed separately from said first shaft portion and fixedly attached to said first shaft portion.

5. In a self-propelled walking mower which comprises: a machine frame (1); an engine (8) mounted on said machine frame and having a vertical output shaft (9) which extends downwardly; a mowing blade (10) supported by said machine frame and adapted to be driven by said engine; left and right drive wheels (3) for driving the mower; and a transmission (11) for transmitting mower-driving power from said engine to said drive wheels, said transmission comprising:

a casing (12) disposed within said machine frame (1);

a horizontal wheel axle (18) journalled in said casing, said wheel axle extending leftwardly and rightwardly from said casing to drive said left and right drive wheels (3);

a vertical input shaft (13) rotatably supported by a top wall (12a) of said casing and by a bottom wall (12b) of said casing and having an upper end which extends upwardly of said casing and carries an input pulley (14) co-rotatably mounted thereon, said input shaft intersecting said wheel axle at a location in close proximity to said wheel axle, said input shaft being adapted to be driven to rotate by said output shaft (9) through a belt and pulley mechanism which includes said input pulley; and a hypoid gearing (26) including a hypoid pinion (27) mounted on said input shaft, and a larger hypoid gear (29) mounted on said wheel axle and meshing with said hypoid pinion, at least one of said input shaft (13) and said wheel axis (18) including an outer diameter-reduced portion (13a, 18a) at the intersection of said input shaft and said wheel axle.

* * * * *

UNITED STATES PATENT AND TRADEMARK OFFICE
CERTIFICATE OF CORRECTION

PATENT NO.   : 5,778,645
DATED        : July 14, 1998
INVENTOR(S)  : Koji Irikura et al.

It is certified that error appears in the above-indentified patent and that said Letters Patent is hereby corrected as shown below:

Claim 1, column 7, line 66, delete "axles" and substitute therefor -- axle --.

Claim 2, column 8, line 20, delete "rotatable" and substitute therefor -- rotatably --.

Signed and Sealed this

Seventeenth Day of November, 1998

Attest:

BRUCE LEHMAN

Attesting Officer            Commissioner of Patents and Trademarks